April 26, 1938.     F. U. WAGNER ET AL     2,115,242
HOLD-DOWN DEVICE FOR SHIPPING CONTAINERS
IN FREIGHT CARS, MOTOR TRUCKS, AND SHIPS
Filed May 18, 1937
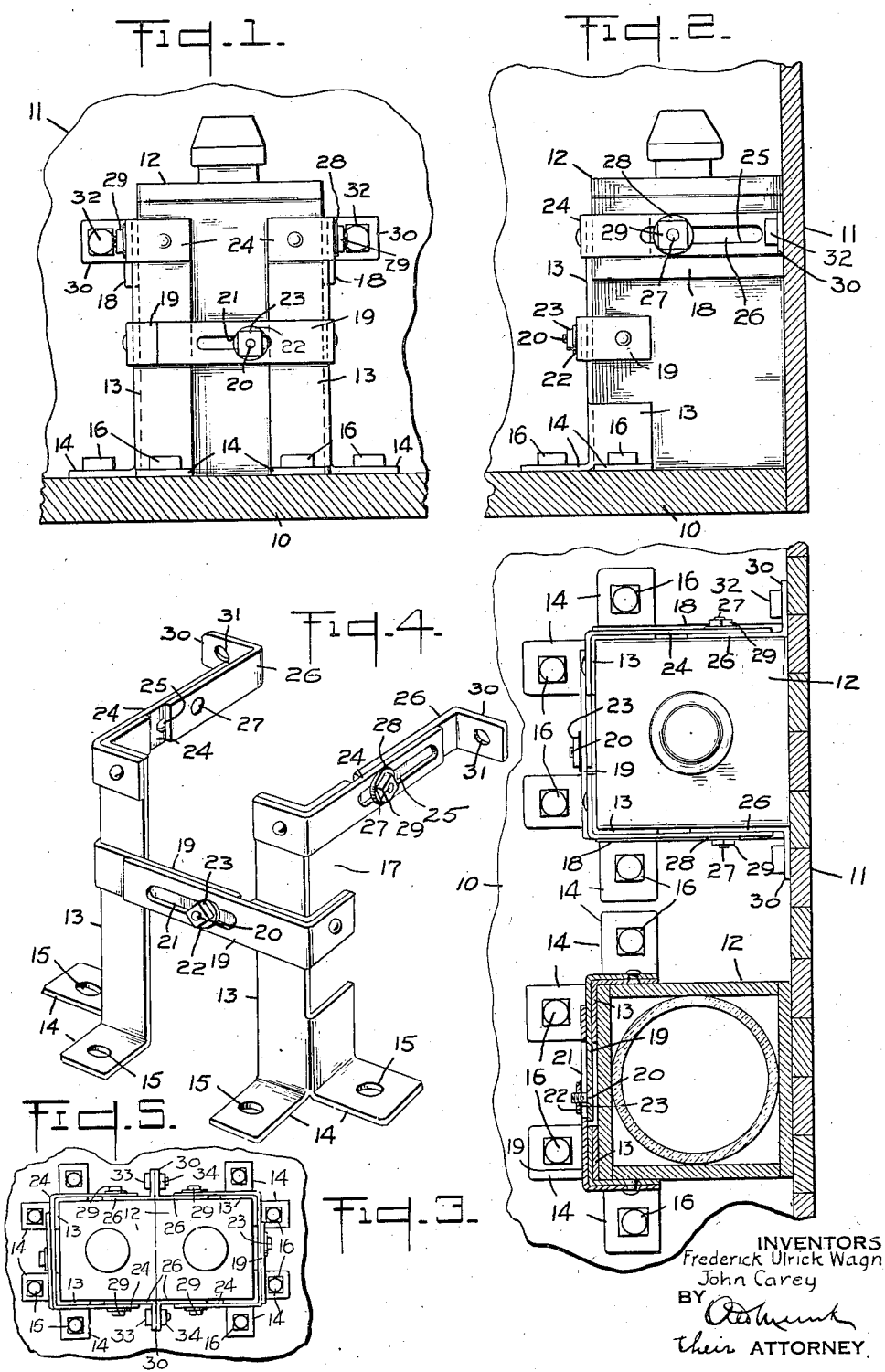
INVENTORS
Frederick Ulrick Wagner
John Carey
BY
Their ATTORNEY.

Patented Apr. 26, 1938

2,115,242

UNITED STATES PATENT OFFICE 2,115,242

HOLD-DOWN DEVICE FOR SHIPPING CONTAINERS IN FREIGHT CARS, MOTOR TRUCKS, AND SHIPS

Frederick Ulrick Wagner and John Carey, Rahway, N. J.

Application May 18, 1937, Serial No. 143,286

5 Claims. (Cl. 248—119)

This invention relates to improvements in hold-down devices used in freight cars, motor trucks and ships to securely hold down carboys, crates or other types of shipping containers on the floor, and against the side wall of the carriers while in transit.

The problem of safely transporting carboys and other more or less fragile containers in freight cars, motor trucks and in ships, is one which has caused carriers of this class of merchandise considerable trouble and loss. To take a carboy as an example, it will be readily appreciated that the glass bottle, which is encased in a wood container or box and which contains anywhere from five to twenty-five gallons of fluid, according to size, is indeed fragile and may be easily broken if subject to sudden jolts or to pressure directed against its side wall. It is imperative then that the carriers provide some means to securely anchor the carboy to the freight car or truck or water craft, while the latter is en route. The means now in use for this purpose consists in providing wood cleats, which are cut and installed in the carrier to embrace the carboy, and which prevent the same from being tipped or otherwise dislodged by sudden impacts or other strains to which all freight is being constantly subjected on the road. While this means of holding carboys is not entirely devoid of merit, it is extremely costly in both time consumed in cutting and then applying the wood cleats and in the loss of the material itself, which is always destroyed, when the carboy has reached its destination or when it must be transferred to another carrier and recleated before arriving at its final destination.

With the foregoing in mind it is the purpose of the present invention to overcome the disadvantages inherent in the present type of hold down arrangement and to provide a fabricated hold down means for this particular class of merchandise while en route in freight cars, motor trucks or in the hold of a ship, which means is attachably mounted in the carrier to embrace and securely hold and protect the carboy or other container against movement when subjected to sudden impacts or other abnormal conditions beyond the control of the carriers, and which is adjustable to assume various dimensions so as to accommodate a wide range of sizes in containers and further which is easily portable and may be used repeatedly whenever hold down means of this type is required.

We accomplish this purpose by means of a device, described in the following specification, set forth in the appended claims, and illustratively exemplified in the accompanying drawing, in which:—

Figure 1 is a sectional view of a portion of a carrier showing a carboy being held down by means of a device constructed according to the present invention;

Figure 2 is a further section of the carrier showing the carboy, and hold down device in side elevation;

Figure 3 is a plan view of one carboy and hold down device and a substantially transverse sectional view of an adjacent carboy and hold down device;

Figure 4 is a perspective view of the hold down device;

Figure 5 is a top plan view of two carboys arranged in the center of a carrier with the hold down devices attached.

Referring to the drawing, 10 denotes the floor of a carrier e. g. a freight car, motor truck or hold of a ship, and 11 designates the upright side wall thereof. In the present instance we have shown a carboy 12, which is being carried, but it will be understood that the hold down device of the present invention may be just as applicable to furniture crates, and boxes generally, as to the ordinary carboy.

The hold down device comprises upright corner pieces 13, each thereof being constructed preferably of an angle iron which is split along the angle for a short distance at the lower end to permit the two sides to be turned outwardly at right angles to form feet 14. The feet 14 are provided with openings 15 to receive lag-screws 16 arranged upright in the floor 10 of the carrier. The front of each upright 13 remains intact but the side is cut away to provide a slot 17 in which the forward end of the carboy side cleat 18 is accommodated, the lower edge of the slot 17 being adapted to closely embrace the cleat 18 to bear down on the same and prevent upward displacement of the carboy.

The uprights are spaced apart the width of the carboy to be held down so as to bring the upright corners of the box into the corners of the uprights 13, and to maintain the proper spaced relation of the two uprights 13, each is provided with a lateral arm 19, rigidly attached to or forming an integral part of the front of the upright about midway of its height, the arms 19 being long enough to overlap over the front wall of the carboy to form a band. The inner free end of the inside arm 19 carries a threaded stud 20, which projects through a slot 21 in the free end of the other arm 19, and which receives a washer 22 and nut 23, so as to cause the two arms 19 to be rigidly clamped together by tightening down on the nut. This adjustment in the relative positions of the two arms 19 takes care of various widths in containers to be held down.

The upper ends of the upright pieces 13 at their sides are provided with rearwardly projecting arms 24, which are either rigidly attached to the uprights themselves or form integral parts thereof, and which have longitudinally disposed slots 25 in their free end portions. The arms 24 form bands and are attached to the side wall 11 by means of extension pieces 26, each of which consists of a straight section placed against the arm 24, and provided with a threaded stud 27 projecting outwardly from its face adjacent the end to project through the slot 25 and receive a washer 28 and nut 29. The extension piece 26 projects towards the wall 11 and its end is turned about at right angles to form a foot 30 having an opening 31, which receives a lag screw 32 arranged in the wall 11 of the carrier.

To hold down a carboy or other container, according to the present invention, the carboy 12 is arranged in upright position upon the floor 10 with the back against the wall 11 of the carrier. The hold down device is placed about the front and sides of the carboy, bringing the uprights 13 against the outer corners thereof. This is accomplished by simply adjusting the arms 19 to properly separate the uprights 13 and then tightening the nut 23 to fix the adjustment. The extensions 26 are then adjusted rearwardly until the ends 30 abut the wall 11 and the nuts 29 tightened to fix these adjustments. Where it is a carboy, which is being held down, the side cleats 18 come under the side arms 24 to prevent the carboy from working its way upwardly. Having completed the adjustment of the hold down device about the carboy it only remains to fasten the feet 14 and 30 to the floor 10 and wall 11 respectively by means of the lag screws 16 and 32. Once the lag screws have been tightened, the carboy cannot be tipped or dislodged.

When the shipment reaches its destination, the hold down device may be removed by merely removing the lag screws and freeing the feet. After discharging the carboy or container, the device may be left in the carrier for further use or returned to the original station from which the shipment was made.

Thus in the adoption of the present invention, the costly use and subsequent destruction of wood cleats are entirely avoided; the containers and particularly carboys are insured safer transportation, and further the hold down devices may be used again and again on the same or different sizes of containers by simply adjusting them as to width and depth.

In some instances the carboys may be disposed centrally of a freight car or other carrier means, in which case the side walls of the carrier would not be available for anchorage of the feet 30. To use the hold down devices under these circumstances, see Figure 5, two carboys 12 are placed back to back and two sets of hold down devices are placed about the two carboys so as to bring the feet 30 of one hold down device against the feet 30 of the other device. Bolts 33 are placed in the registered openings of the two sets of feet 30 and by means of a nut 34 the two feet are drawn tightly together making the two hold down devices practically integral. The feet 14 resting upon the floor of the carrier are anchored by means of the lag screws 16.

What we claim and desire to secure by Letters Patent is:—

1. An apparatus for holding down shipping containers in freight cars or other carriers, comprising lateral bands, to embrace the front of the container, and arms to embrace the sides thereof, the ends of the arms being provided with foot portions to attach to the side wall of the carrier, and uprights supporting the bands and arms and embracing the outer corners of the container and being further provided with foot portion to attach to the floor of the carrier.

2. An apparatus for holding down shipping containers in freight cars or other carriers, comprising uprights of angular stock having the lower ends spread apart to form feet attachable to the floor of the carrier and being arranged to embrace the other corners of the container, a band extensible longitudinally thereof and integral at its ends in the uprights whereby the latter are adjustable relatively to each other to accommodate therebetween different size containers, means for fixing the band in adjusted position, and extensible arms projecting from the uprights to embrace the sides of the container and having end portions attachable to the side wall of the carrier, means to fix the arms in any longitudinal adjustment thereof.

3. An apparatus for holding down shipping containers in freight cars or other carriers and especially carboys having lateral side cleats, comprising upright angle irons to embrace the outer corners of the carboy, these upright upon the floor and against one wall of the carrier, the side portions of the angle irons being cut away to receive the side cleats of the carboy and prevent upward displacement thereof, means connected to the uprights and adjustable longitudinally to hold the uprights in spaced relation, means carried by each upright and extensible at the sides of the carboy and attachably mounted on the wall of the carrier to hold the carboy against sidewise displacement, and means attachably connecting the lower ends of the uprights and said second named means to the wall and floor respectively of the carrier.

4. An apparatus for holding down shipping containers in freight cars or other carriers, comprising upright angularly shaped irons adapted to fit around the front of the container and to be attached to the floor of the carrier, strip means for fixing the spacing between the irons, and further means adapted to be attached to the wall of the carrier and adjustable longitudinally to fix the space between the uprights and the said wall of the carrier.

5. In a device for holding down two or more shipping containers which have been placed together upon the floor of a carrier, and away from any upright walls, the combination of lateral arms to embrace each container and to be attached at their free ends to the free ends of the lateral arms embracing another container, and upright angularly shaped irons supporting the arms and embracing the containers.

FREDERICK ULRICK WAGNER.
JOHN CAREY.